(12) United States Patent
Sauder et al.

(10) Patent No.: US 9,615,504 B2
(45) Date of Patent: Apr. 11, 2017

(54) AGRICULTURAL INPUT SELECTION SYSTEM, METHODS AND APPARATUS

(71) Applicant: PRECISION PLANTING LLC, Tremont, IL (US)

(72) Inventors: Timothy Sauder, Tremont, IL (US); Phil Baurer, Tremont, IL (US); Troy Plattner, Goodfield, IL (US)

(73) Assignee: Precision Planting LLC, Tremont, IL (US)

(*) Notice: Subject to any disclaimer, the term of this patent is extended or adjusted under 35 U.S.C. 154(b) by 0 days.

(21) Appl. No.: 14/653,183

(22) PCT Filed: Dec. 21, 2013

(86) PCT No.: PCT/US2013/077357
§ 371 (c)(1),
(2) Date: Jun. 17, 2015

(87) PCT Pub. No.: WO2014/100796
PCT Pub. Date: Jun. 26, 2014

(65) Prior Publication Data
US 2015/0334912 A1    Nov. 26, 2015

Related U.S. Application Data

(60) Provisional application No. 61/745,315, filed on Dec. 21, 2012.

(51) Int. Cl.
*A01C 7/00* (2006.01)
*A01C 21/00* (2006.01)
*A01B 79/00* (2006.01)

(52) U.S. Cl.
CPC .............. *A01C 7/00* (2013.01); *A01B 79/005* (2013.01); *A01C 21/005* (2013.01)

(58) Field of Classification Search
CPC ........ A01C 7/00; A01C 21/005; A01B 79/005
USPC .......................................................... 701/50
See application file for complete search history.

(56) References Cited

U.S. PATENT DOCUMENTS

| 4,023,509 | A | 5/1977 | Hanson |
| 5,915,313 | A * | 6/1999 | Bender ................ A01B 79/005 111/178 |
| 6,164,222 | A | 12/2000 | Mayerle et al. |
| 6,527,205 | B2 * | 3/2003 | Andersson .......... A01C 21/005 239/656 |

(Continued)

FOREIGN PATENT DOCUMENTS

| WO | 2012129442 A3 | 9/2012 |
| WO | 2014113803 A1 | 7/2014 |

OTHER PUBLICATIONS

European Search Report, Issue Jun. 21, 2016, pp. 1-7.

*Primary Examiner* — Yazan Soofi
(74) *Attorney, Agent, or Firm* — Thomas J. Oppold; Larkin Hoffman Daly & Lindgren. Ltd.

(57) ABSTRACT

Systems, methods and apparatus for applying varying agricultural inputs in accordance with a prescription map. The system includes a plurality of input sources each containing different agricultural inputs. A variety selector selectively places the different inputs from the plurality of input sources in communication with a meter for dispensing the inputs in accordance with the prescription map to minimize prescription errors.

20 Claims, 20 Drawing Sheets

(56) References Cited

U.S. PATENT DOCUMENTS

| | | | |
|---|---|---|---|
| 7,273,016 B2 * | 9/2007 | Landphair | A01C 19/02 111/185 |
| 7,347,149 B2 * | 3/2008 | Mayerle | A01C 7/06 111/175 |
| 7,673,572 B2 * | 3/2010 | Deppermann | A01B 79/005 111/200 |
| 8,863,676 B2 * | 10/2014 | Brockmann | A01C 7/088 111/186 |
| 2006/0278726 A1 | 12/2006 | Holly | |
| 2007/0048434 A1 | 3/2007 | Mayerle et al. | |
| 2010/0070072 A1 * | 3/2010 | Goldman | A01C 21/005 700/225 |
| 2011/0098851 A1 | 4/2011 | Glendenning et al. | |
| 2011/0178632 A1 | 7/2011 | Straeter | |
| 2014/0165889 A1 | 6/2014 | Garner et al. | |
| 2014/0165890 A1 | 6/2014 | Graham | |
| 2014/0165891 A1 | 6/2014 | Garner et al. | |
| 2014/0174330 A1 | 6/2014 | Garner et al. | |
| 2015/0059630 A1 * | 3/2015 | Kinzenbaw | A01C 7/044 111/200 |

* cited by examiner

AGRICULTURAL INPUT SELECTION SYSTEM, METHODS AND APPARATUS

BACKGROUND

In recent years, the availability of global positioning systems for commercial applications have enabled varying application rates of agricultural inputs throughout a field. While effective systems have been developed for varying the applications rates of agricultural inputs, systems for varying the types or varieties of agricultural inputs during agricultural operations have proven either costly or ineffective. Thus, there is a need for systems capable of effectively varying agricultural input types or varieties during agricultural operations.

DESCRIPTION

Figure 1:
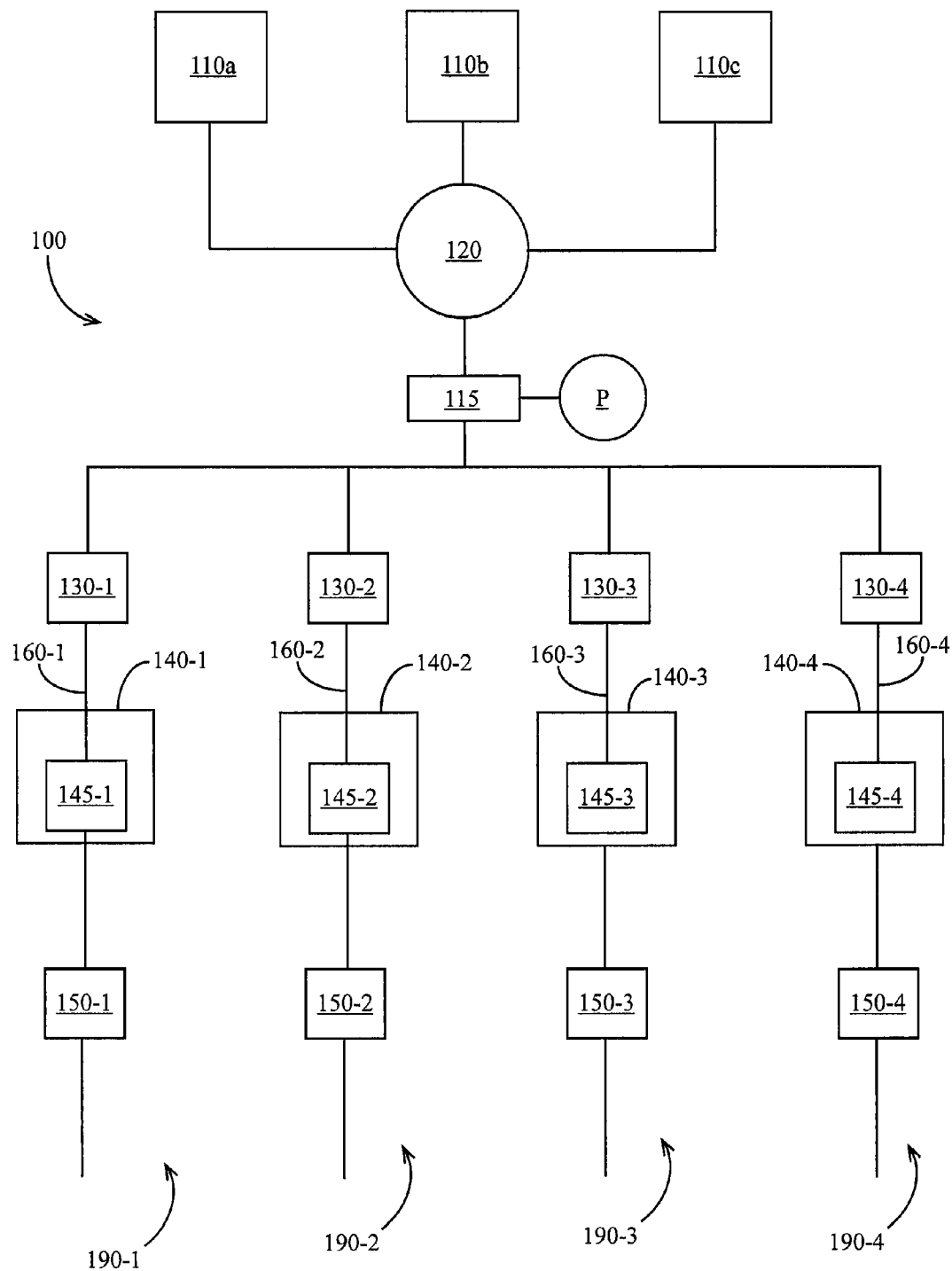
FIG. 1 schematically illustrates an embodiment of an agricultural input selection system.

Referring to the drawings, wherein like reference numerals designate identical or corresponding parts throughout the several views, FIG. 1 schematically illustrates an agricultural input selection system 100. It should be appreciated that the agricultural inputs may be different seed types, seed varieties or any other desired materials which are metered and applied to a field during an agricultural operation.

In one embodiment the selection system 100 is a seed variety selection system which is preferably mounted to a pneumatic seed delivery planter such as disclosed in U.S. Pat. No. 7,779,770, the disclosure of which is incorporated herein by reference, which planter is preferably drawn through the field by a tractor (not shown). In this embodiment, the input selection system 100 preferably includes a plurality of segregated input sources 110, such as bulk seed hoppers 110a, 110b, 110c (each containing a different input or seed variety) supported by a toolbar of the planter or a cart drawn behind the planter.

The bulk seed hoppers are in seed communication with a variety switch 120. The variety switch 120 is preferably configured to selectively place one of the bulk seed hoppers in seed communication with an entrainer 115 and is preferably configured to selectively remove, disrupt or shut off seed communication between the bulk seed hoppers and the entrainer 115.

The entrainer 115 is preferably in fluid communication with a blower or other pressure source P and is configured to distribute seeds received pneumatically from the bulk seed hoppers to a plurality of row units 190 via a plurality of pneumatic lines 160. The entrainer 115 and lines 160 are preferably configured to evenly distribute seeds between the row units 190. Each row unit 190 includes a seed meter or seed singulator 140 such as disclosed in Applicant's co-pending International Patent Application No. PCT/US2012/030,192, the disclosure of which is incorporated herein by reference, or any other suitable seed meter. As the seeds are communicated through lines 160 toward the seed meter 140, they preferably pass a first sensor 130 (i.e., a pre-meter sensor 130), which may comprise either an optical sensor or an electromagnetic sensor such as that disclosed in Applicant's co-pending U.S. patent application Ser. No. 12/984,263 ("the '263 application"), the disclosure of which is incorporated herein by reference.

Each seed meter 140 preferably includes a seed pool 145 where seeds gather after being delivered to the meter 140. A seed disc 142 captures seeds from near the bottom of the seed pool 145 and deposits them into a seed tube or seed conveyor. After entering the seed tube or conveyor, the seeds then pass by a second seed sensor 150 (i.e., the post-meter sensor 150), which is preferably mounted to a seed tube of the row unit and which may comprise either an optical sensor or an electromagnetic sensor such as that disclosed in the '263 application. After passing the post-meter sensor 150, the seeds are deposited into a trench opened by the row unit.

Figure 4A:
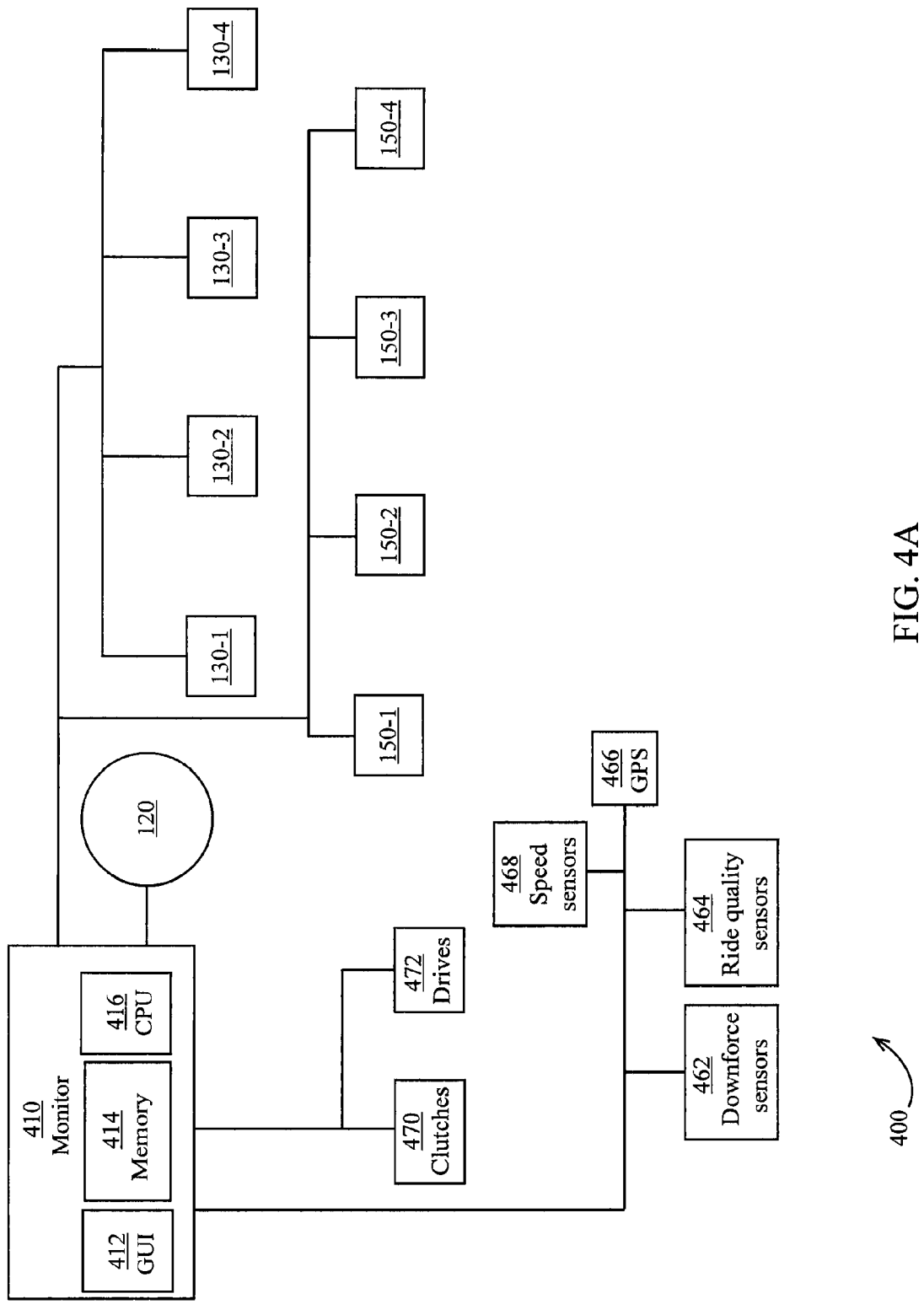
FIG. 4A schematically illustrates an embodiment of an agricultural input selection system.

Turning to FIG. 4A, an electrical system 400 for controlling the input switch or variety switch 120 is illustrated schematically. The electrical system 400 preferably includes a monitor 410 having a graphical user interface 412, a memory 414 and a CPU 416. The monitor 410 is preferably in electrical communication with the variety switch 120, the pre-meter sensors 130, and the post-meter sensors 150 of the input selection system 100. The monitor 410 is preferably also in electrical communication with a global positioning ("GPS") receiver 466 preferably mounted to the tractor, and one or more speed sensors 468 preferably mounted to the tractor or the planter. The monitor 410 is preferably also in electrical communication with row clutches 470 and seed meter drives 472 configured to individually control each seed meter 140 or a group of seed meters. The monitor 410 is also preferably in electrical communication with an array of downforce sensors 462 (e.g., strain gauges) configured to measure the downforce applied to individual row units of the planter and an array of ride quality sensors 462 (e.g., accelerometers) configured to generate a signal related to the ride quality of individual row units of the planter.

Variety Switch—Apparatus

The variety switch 120 preferably comprises a selection such as the embodiments disclosed in U.S. Pat. No. 5,915,313 ("the '313 patent"), the disclosure of which is incorporated herein by reference. Preferably, the embodiments may comprise a switch assembly, a single valve or multiple valves as disclosed in the '313 patent. It should be appreciated that unlike the '313 patent, the variety switch is preferably configured to selectively place three or more bulk hoppers in seed communication with the entrainer 115. Further, the variety switch preferably includes an "off" state in which none of the bulk seed hoppers are in seed communication with the entrainer 115.

Variety Switch—Methods

Figure 2A:
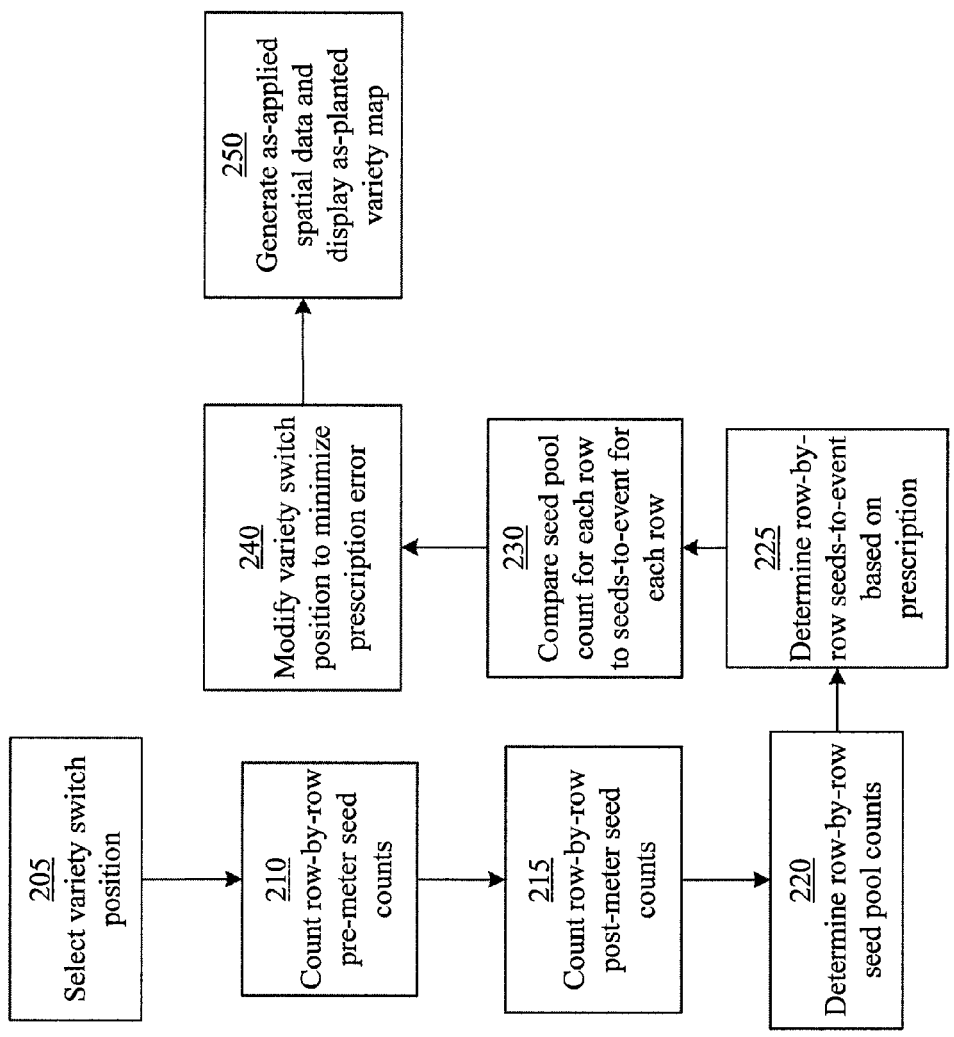
FIG. 2A illustrates an embodiment of a process for selecting agricultural inputs.

Turning to FIG. 2A, a process 200 is illustrated for selecting a state or position of the variety switch 120. At step 205, the monitor 410 preferably selects a position of the variety switch 120 to permit seed communication from the bulk hopper containing the desired seed variety to be planted corresponding to the location of the planter (e.g., reported by the GPS receiver 466) in reference to a variety prescription map stored in the memory 414 of the monitor. For illustrative purposes, a variety prescription map 310 is illustrated having a first region 312a corresponding to a first variety and a second region 312b corresponding to a second variety. The first region 312a and second region 312b are preferably separated by a boundary 315. The graphical representation of the planter 10 and row units 1, 2, 3, 4 represents the position of the planter and row units relative to the prescription map. At step 205 the monitor preferably commands the variety switch to select the bulk seed hopper 110 (e.g., hopper 110a) containing the seed variety corresponding to region 312a because the row units are located in the region 312a.

Figure 5:
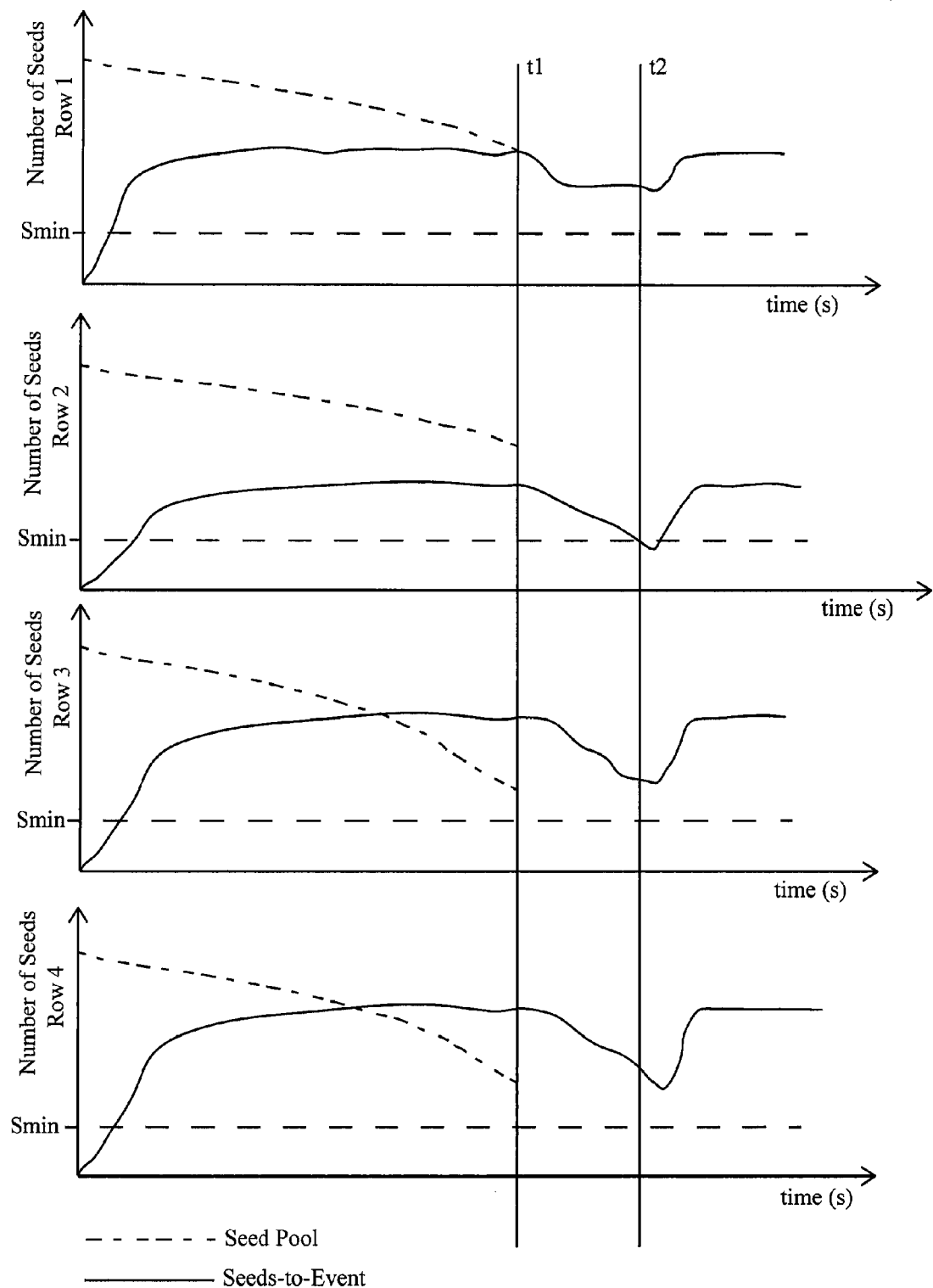
FIG. 5 illustrates the number of seeds in four seed pools plotted against time.

At step 210, the monitor 410 preferably counts the number of seeds passing the pre-meter sensor 130 at each row 190. At step 215, the monitor 410 preferably counts the number of seeds passing the post-meter sensor 150 at each row 190. At step 220, the system determines a row-by-row seed pool count by subtracting the cumulative number of seeds that have passed the post-meter sensor 150 from the cumulative number of seeds that have passed the pre-meter sensor 130. Referring to FIG. 5, an illustrative set of seed pool counts for four rows are illustrated. It should be appreciated that in normal operation of the system 100, each row reaches a steady-state value after a period of time. In other embodiments the seed pool count may be established using an estimated value stored in the memory 414 such that a pre-meter sensor 130 is not necessary. It should be appreciated that the estimated steady-state seed pool count depends on the type of seed in the seed pool. Thus, in such embodiments, the monitor is preferably configured to allow a user to select a seed type or variety corresponding to each bulk hopper 110, and the memory 414 preferably includes an estimated steady-state seed pool count for each seed type. In embodiments without a pre-meter sensor 130, the monitor may determine whether the estimated steady-state value has been met by determining whether a predetermined time has passed since a state of the variety switch 120 was selected. Alternatively, an optical fill level sensor (not shown) mounted at the top of the seed pool 145 may be in electrical communication with the monitor 410 and configured to send a signal indicating whether the seed pool 145 is full of seed.

The number of "seeds-to-event" is determined at step 225, at step 230 the monitor 410 preferably compares the seed pool count to the number of seeds-to-event. The term "seeds-to-event" as used herein refers to the number of seeds that need to be dispensed prior to crossing a boundary 315 (i.e., the "event") defining the regions 312 corresponding to different seed varieties. The number of seeds-to-event over time for each row is illustrated in FIG. 5. As the planter approaches a boundary 315, the number of seeds-to-event decreases over time.

Figure 3:
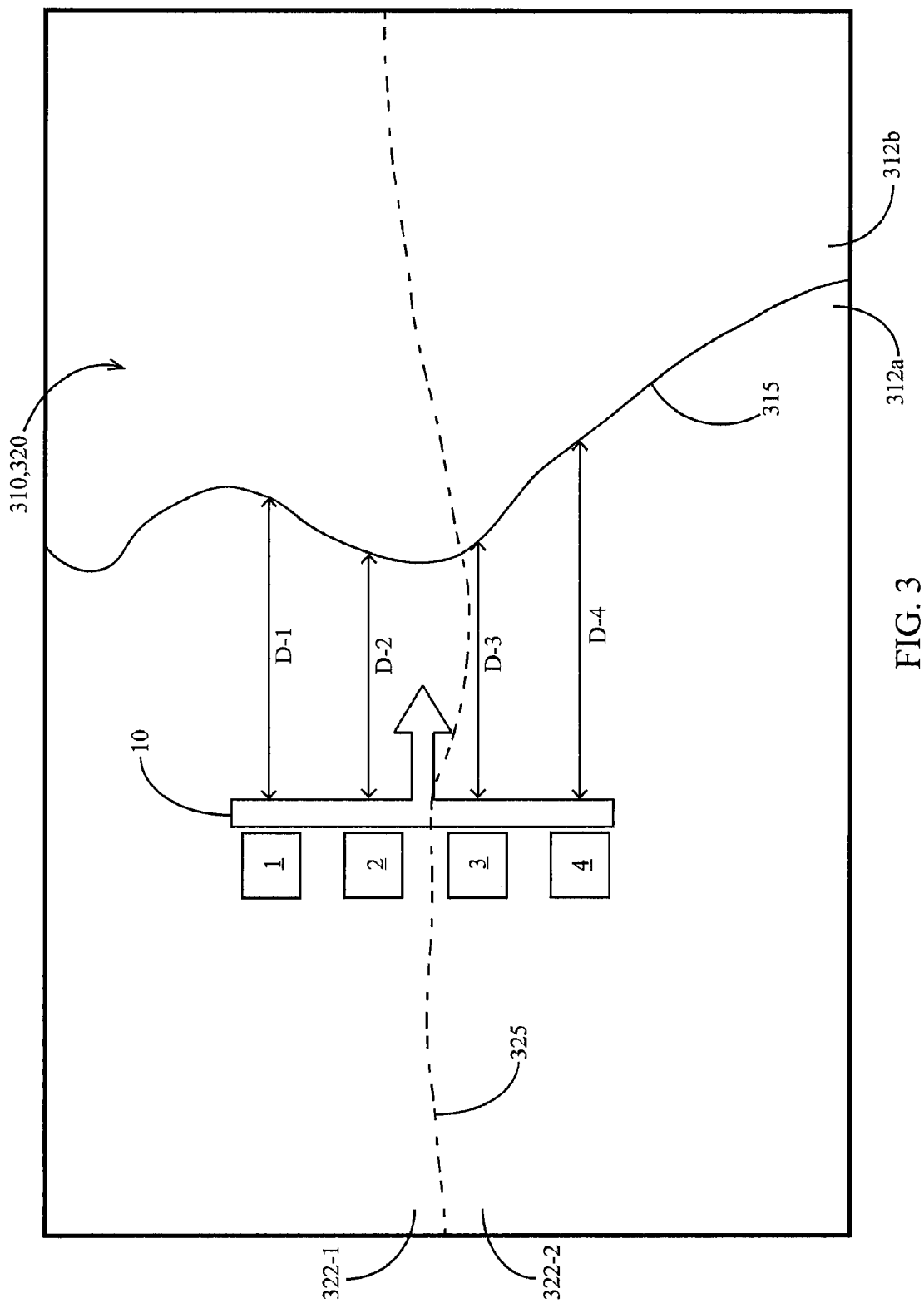
FIG. 3 illustrates an embodiment of a application rate and input variety map.

Referring to FIG. 3, the variety prescription 310 is shown layered over an application rate prescription map 320 comprising two regions 322-1 and 322-2 (defining different application rates) separated by a boundary 325. In the illustrated position, the row units 1-4 pass through varying distances D before crossing the boundary 315 defining a different seed variety to be planted at the application rates 322-1 and 322-2. Thus, the row units 1-2 are planting at a differing application rate than the row units 3-4. The monitor 410 preferably estimates the distances D based on the GPS position and heading of the planter and the position of the row units 1-4. The monitor 410 then preferably calculates the number of seeds-to-event for each row unit by multiplying the application rate corresponding to the row unit location by the distance D and multiplying the result by a constant conversion factor.

Figure 2B:
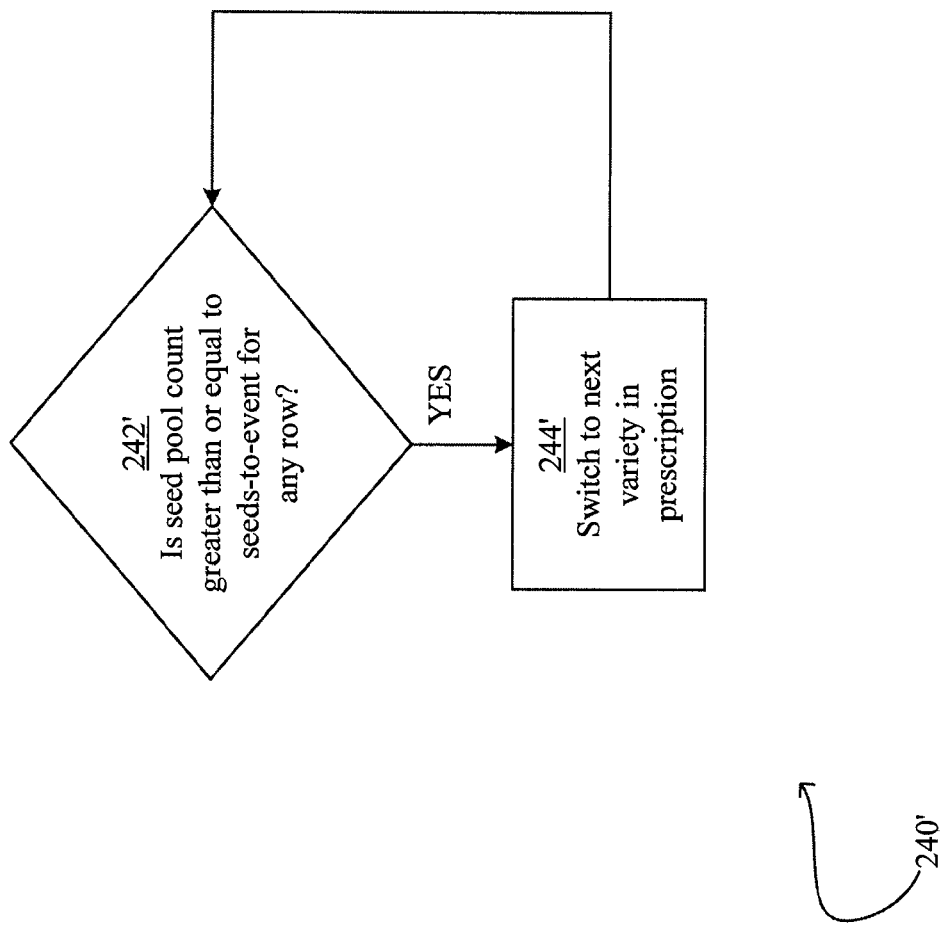
FIG. 2B illustrates an embodiment of a process for selecting a variety switch position.
Figure 2C:
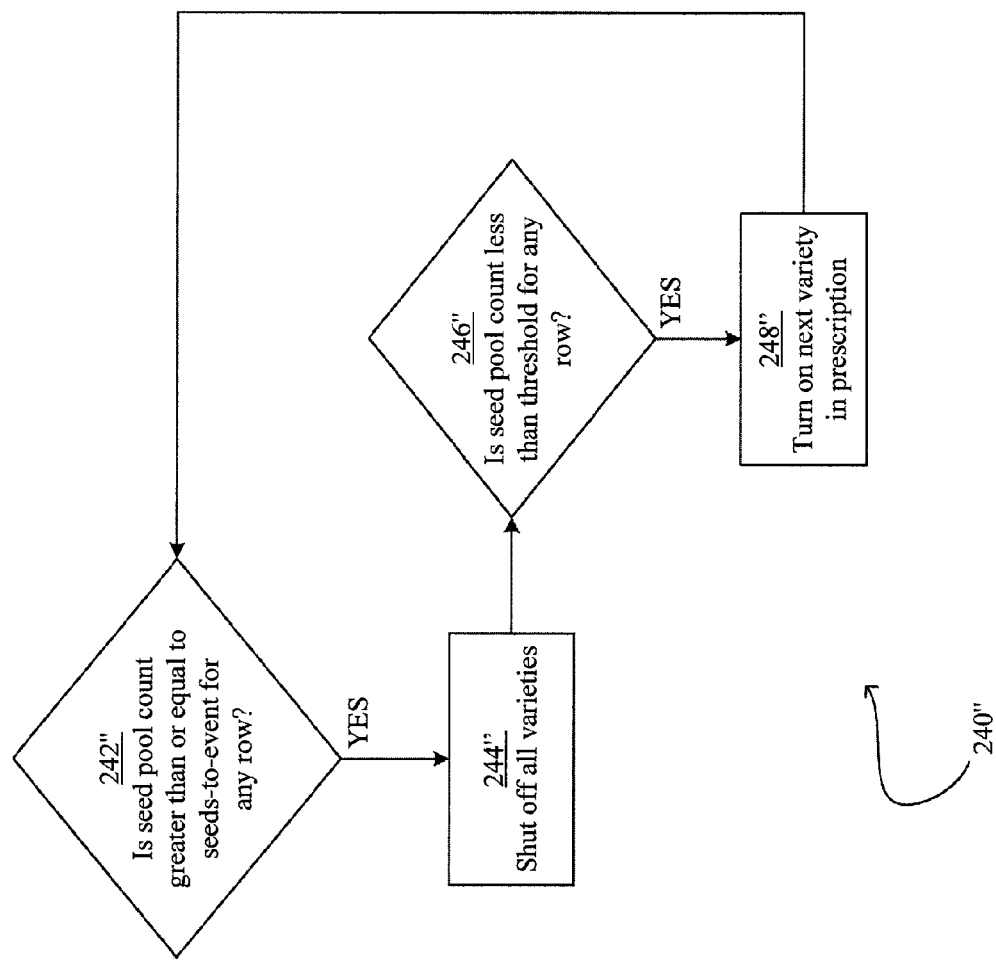
FIG. 2C illustrates another embodiment of a process for selecting a variety switch position.

At step 240, the monitor 410 preferably modifies the position of the variety switch to minimize prescription error. A first process 240' for carrying out step 240 is illustrated in FIG. 2B. At step 242', the monitor 410 preferably determines whether the seed pool count is greater than or equal to the number of seeds-to-event for any of the rows. If so, at step 244', the monitor 410 preferably commands the variety switch 120 to switch to the hopper carrying the variety associated with the region on the other side of the boundary 315 (the post-event variety). A second process 240" for carrying out step 240 is illustrated in FIG. 2C. At step 242", the monitor 410 preferably determines whether the seed pool count is greater than or equal to the number of seeds-to-event for any of the rows. Referring to FIG. 5, step 242" is satisfied at time t1. Once step 242" is satisfied, at step 244", the monitor 410 preferably commands the variety switch 120 to disconnect or interrupt communication of all the bulk hoppers 110 from the entrainer 115.

Referring to FIG. 5, when step 244" is carried out, the seed pool count begins to decrease. The decreasing level of the seed pool may be measured by subtracting the number of seeds counted by the seed sensor 150 from the steady-state seed pool value. At step 246", the monitor 410 preferably determines whether the seed pool count is less than a minimum threshold (illustrated as Smin in FIG. 5). In some embodiments, step 246" is carried out by comparing the seed pool count to Smin. In other embodiments, an optical sensor located near the bottom of the seed pool 145 is in electrical communication with the monitor 410 such that the monitor 410 determines whether the seed pool is at Smin based on the signal generated by the optical sensor. Referring to FIG. 5, step 246" is satisfied at time t2. Once step 246" is satisfied, at step 248" the monitor 410 preferably commands the variety switch 120 to switch to the hopper carrying the variety on the other side of the event (e.g., the boundary 315). Referring to FIG. 5, when step 248 is carried out, the seed pool count begins to increase.

Figure 11:
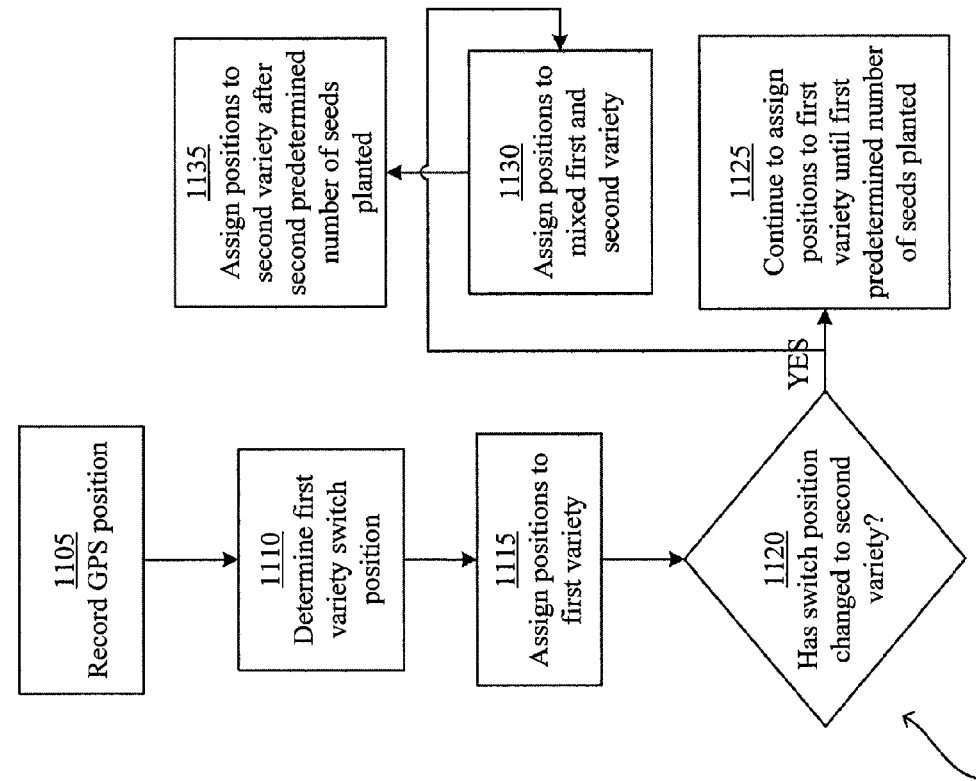
FIG. 11 illustrates a method of generating mapping data representing as-applied agricultural input selection.

At step 250, the monitor 410 preferably generates as-applied spatial data and displays an as-planted variety map as described herein with reference to FIG. 11.

Variety Switch and Row Switch—Systems

Figure 7A:
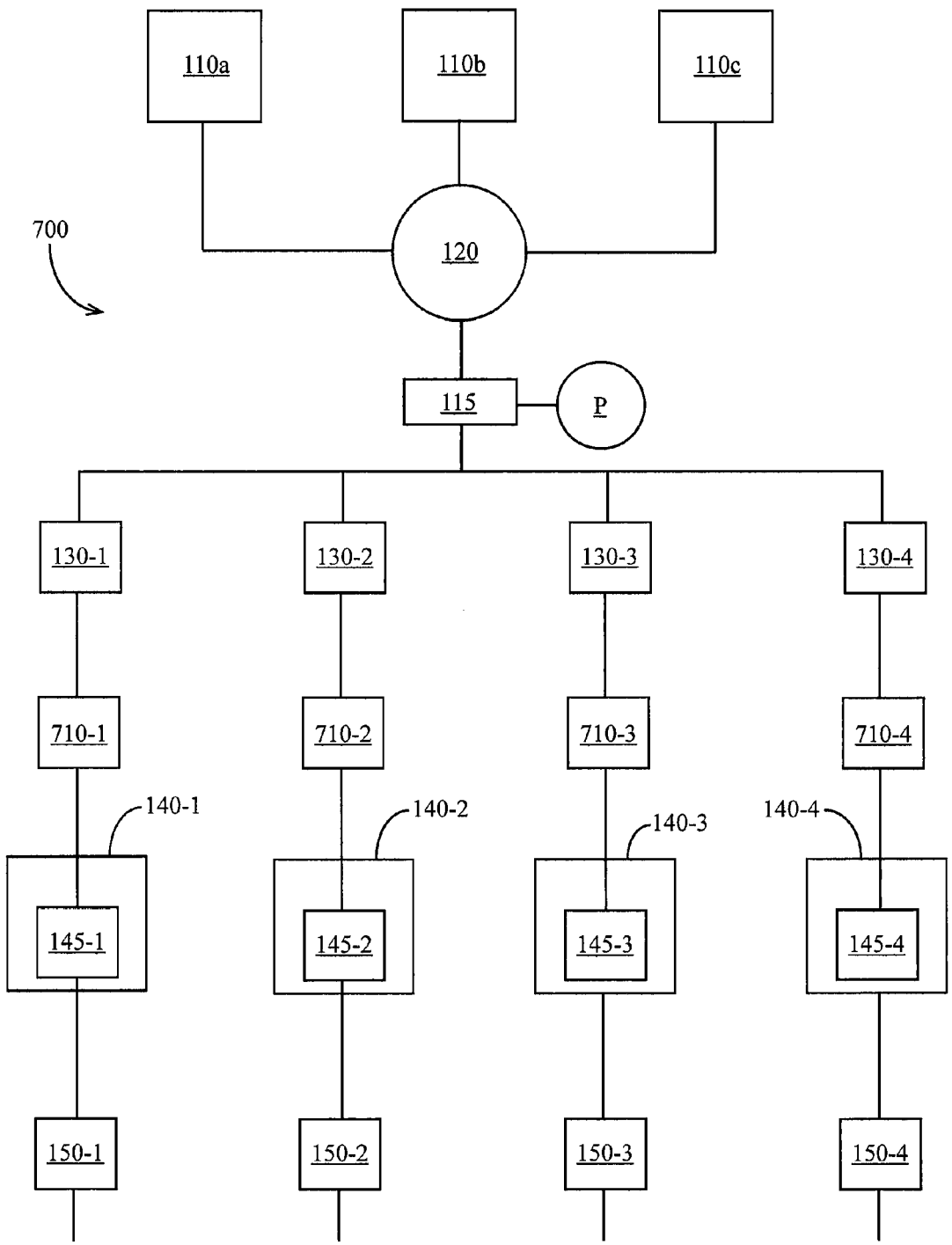
FIG. 7A illustrates an embodiment of an agricultural input selection system including row shut-off devices.

Turning to FIG. 7A, a variety switch system 700 is illustrated. The variety switch system 700 is similar to one of the embodiments described with reference to FIG. 1 except that a row switch 710 at each row unit 190 is preferably in seed communication with the entrainer 115 and disposed such that seeds flow through the row switch 710 after passing the pre-meter sensor 130 (in embodiments having the sensor 130) and before entering the meter 140. Each row switch 710 is preferably configured to selectively prevent and allow seed flow to its associated row unit 190.

Figure 4B:
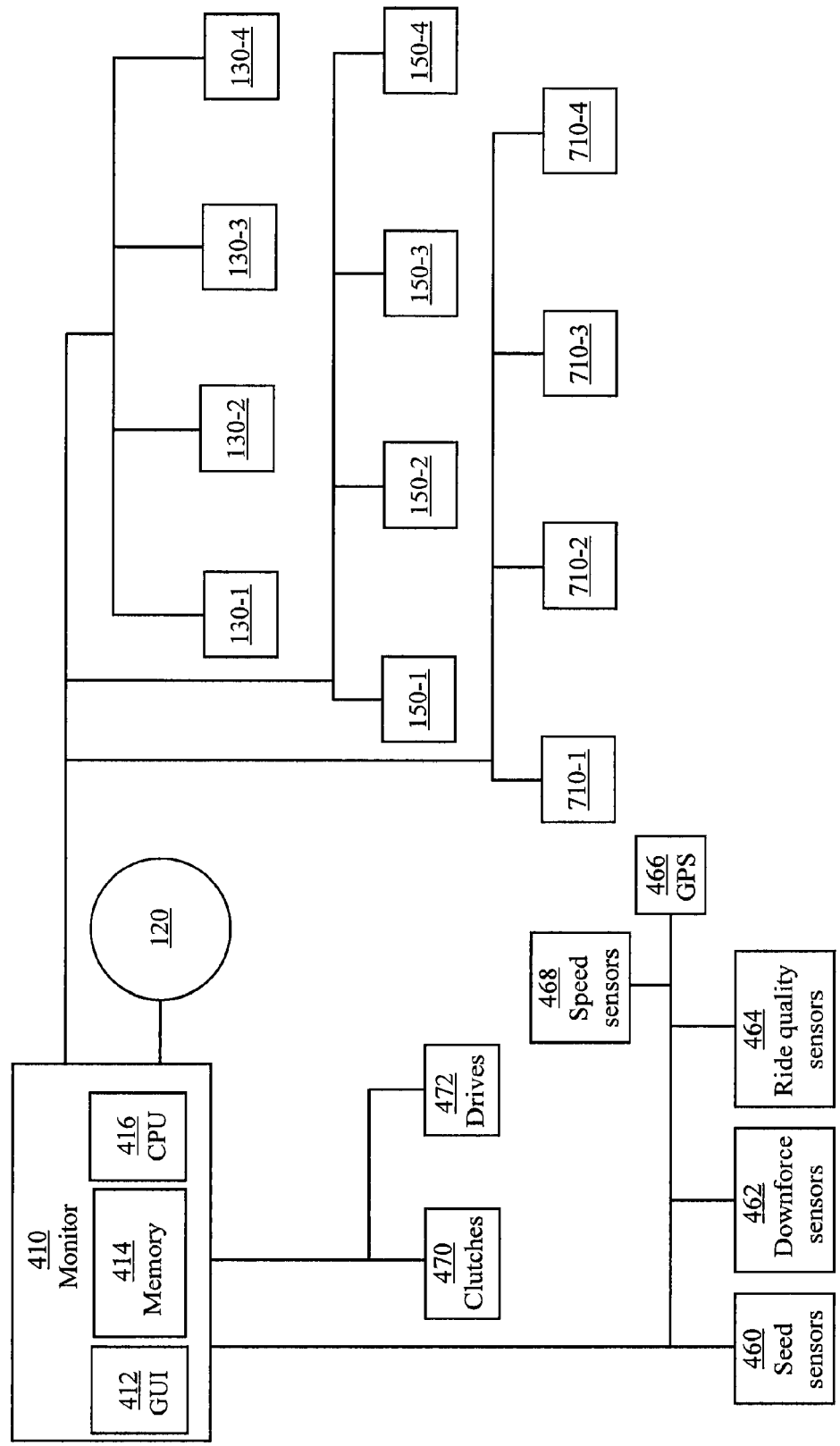
FIG. 4B illustrates another embodiment of an agricultural input selection system.

An electronic system 400' for controlling the variety switch system 700 is illustrated in FIG. 4B. The system 400' is similar to the system 400 except that the monitor is additionally in electrical communication with each row switch 710.

Variety Switch and Row Switch—Apparatus

Figure 7B:
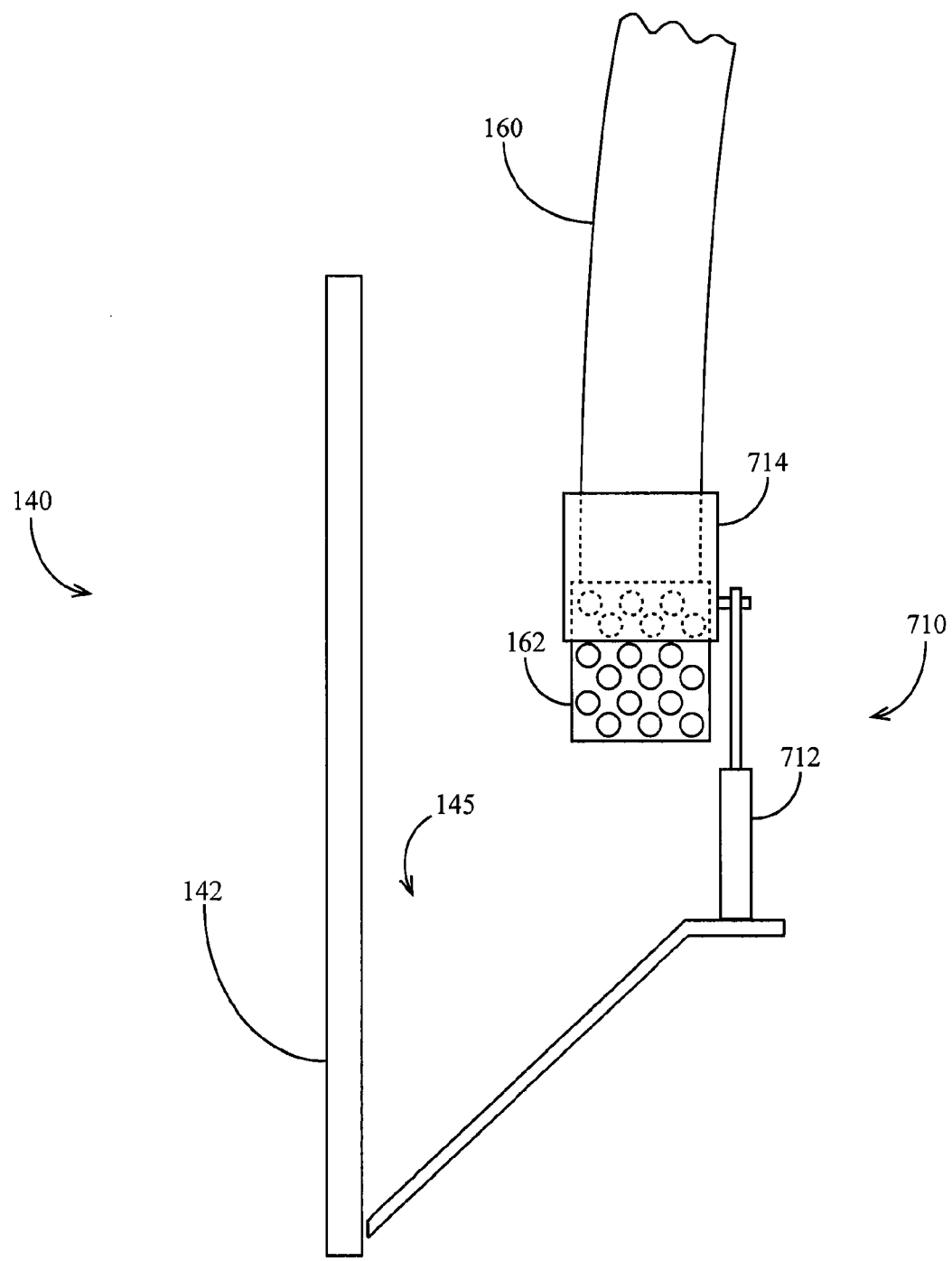
FIG. 7B is a partial front elevation view of an embodiment of a row shut-off device.

An embodiment of a row switch 710 is illustrated in FIG. 7B. The row switch 710 preferably includes an actuator 712 mounted to the meter 140 and operably coupled to a sleeve 714. As the actuator 712 lowers the position of the sleeve 714, the sleeve reduces the effective venting area of a vent 162 which vents the line 160 and the interior of the meter 140 to atmosphere. Thus, as the sleeve 714 is lowered, seed delivery to the seed pool 145 is slowed or stopped.

Figure 7C:
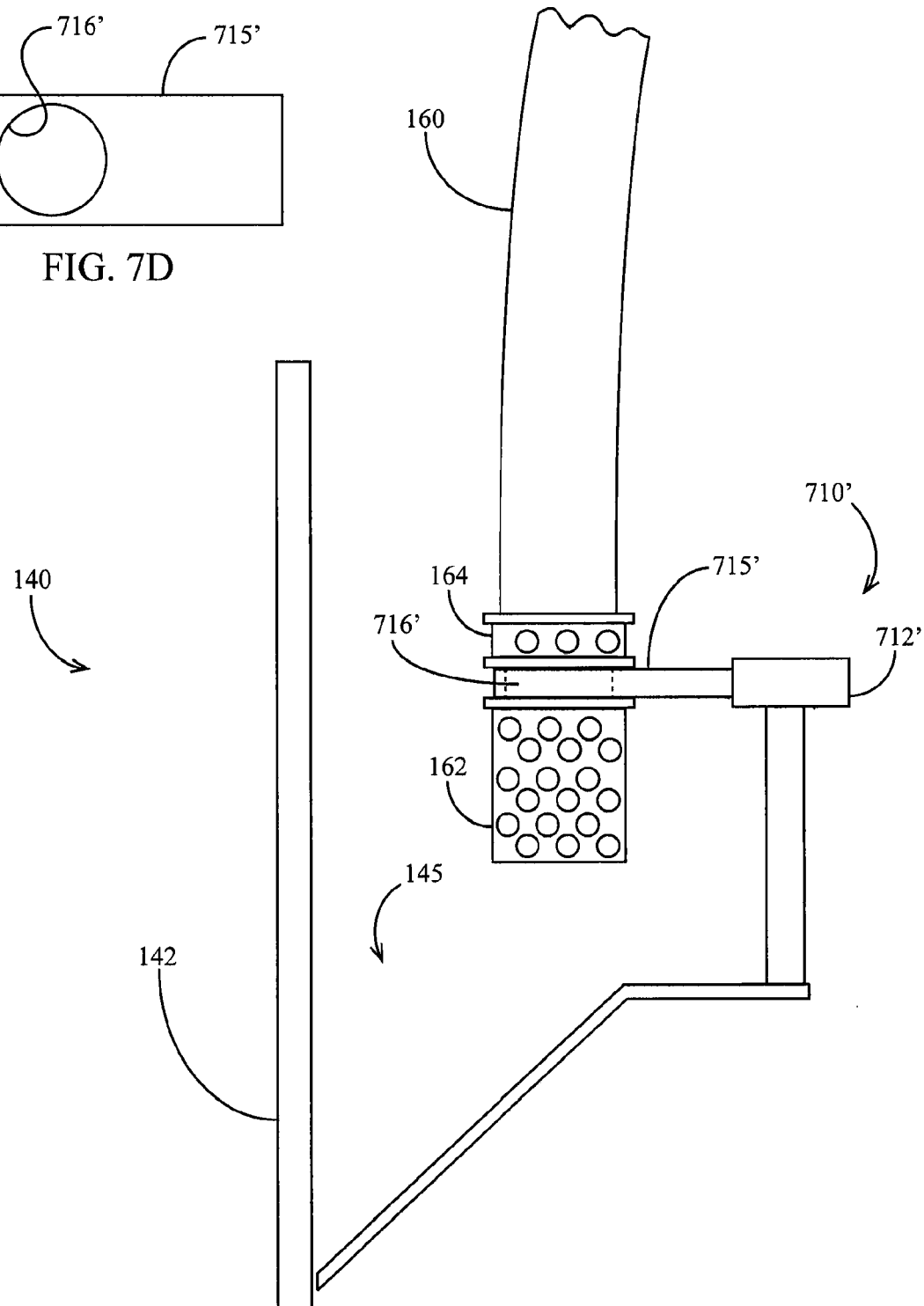
FIG. 7C is a partial front elevation view of another embodiment of a row shut-off device.
Figure 7D:
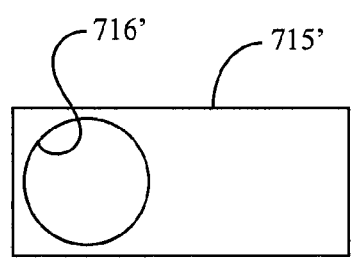
FIG. 7D is a top view of a slat of the row shut-off device of FIG. 7C.

An alternative embodiment of a row switch 710' is illustrated in FIG. 7C. The row switch 710' includes an actuator 712' mounted to the meter 140 and operably coupled to a slat 715'. As illustrated in FIG. 7D, the slat 715' preferably includes an orifice 716' sized to allow air and seed flow through the line 160. The actuator 712' is preferably disposed to selectively move the slat 715' to open or close the line 160. The actuator 712' preferably comprises a pneumatic actuator; the actuator is also preferably spring-biased such that the slat 712' is biased into its right-most position (in the perspective of FIG. 7C) and the row switch 710' is normally open. The meter 140 preferably includes a small cylindrical vent 164 disposed upstream of the slate 715' such that a small air flow is permitted through the line 160 when the row switch 710' is closed.

In other embodiments, the row switch may include a butterfly valve disposed to selectively open or close the line 160.

Variety Switch and Row Switch—Methods

Figure 8A:
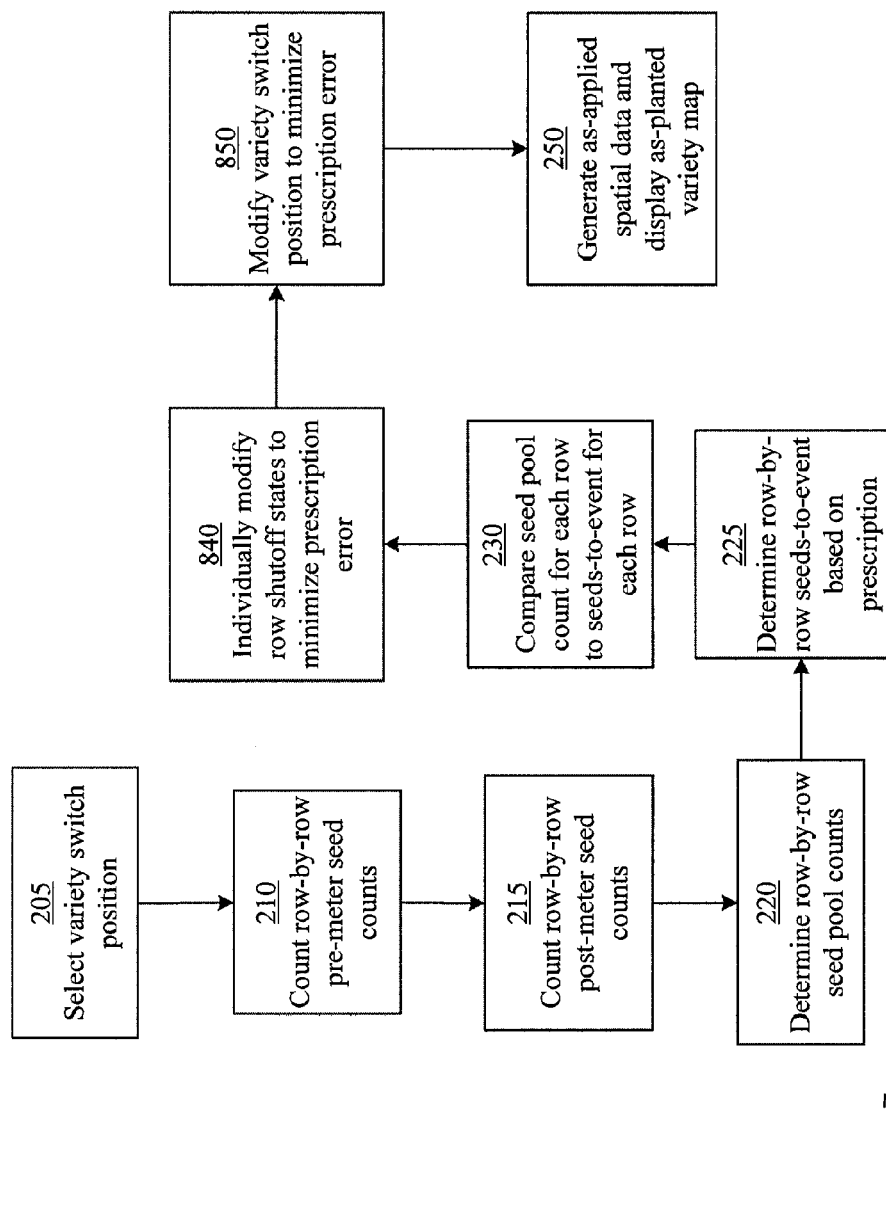
FIG. 8A illustrates an embodiment of a process for selecting agricultural inputs using row shut-off devices.

Turning to FIG. 8A, a process 800 is illustrated for selecting a state of the variety switch 120 and the row switch 710 at each row in the system 700. The process 800 is similar to the process 200 of FIG. 2A except that the step 240 is replaced with step 840 and an added step 850 is performed prior to step 250.

Figure 8C:
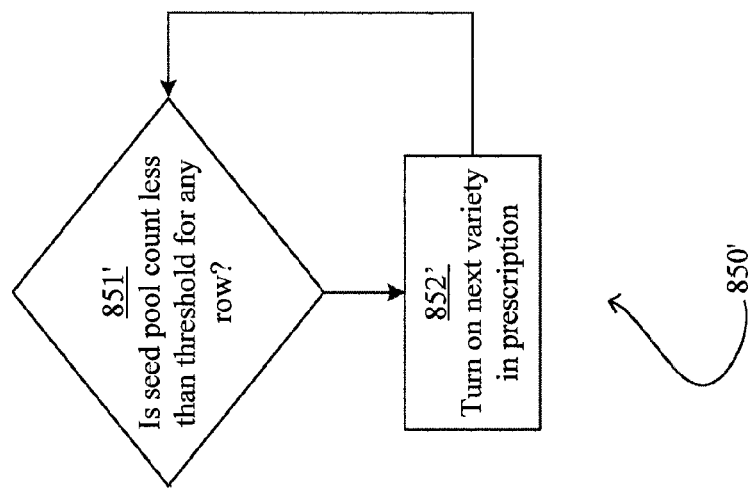
FIG. 8C illustrates an embodiment of a process for selecting a variety switch position.
Figure 8B:
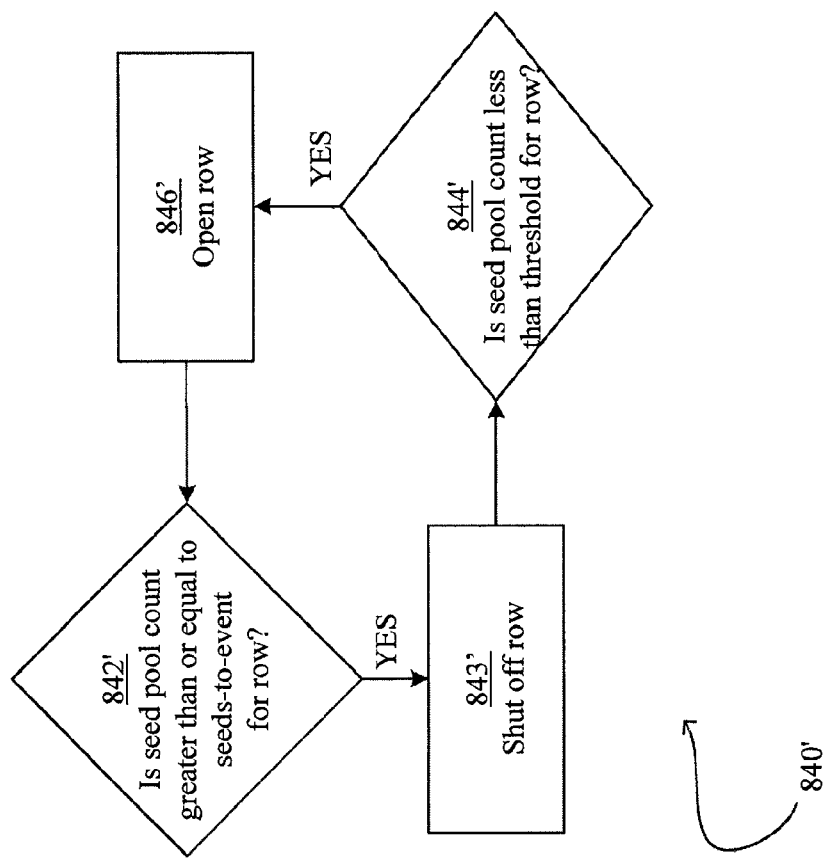
FIG. 8B illustrates an embodiment of a process for selecting a row shut-off device state.

At step 840, the monitor 410 preferably modifies the states of the individual row switches 710 to minimize prescription error. A preferred process 840' for carrying out step 840 is illustrated in FIG. 8B. It should be appreciated that the process 840' is carried out individually for each row unit 190. At step 842', the monitor 410 determines whether the seed pool count is greater than or equal to the seeds-to-event for the row unit. Once step 842' is satisfied, at step 843' the monitor 410 preferably closes the row switch 710 such that seed stops flowing to the meter 140. At step 844', the monitor 410 preferably determines whether the seed pool count is less than a threshold number for the row unit. If step 844' is satisfied, then at step 846 the monitor 410 preferably commands the row switch 710 to open such that seed flows to the meter 140.

At step 850, the monitor 410 preferably modifies the variety switch position to minimize prescription error. A preferred process 850' for carrying out step 850 is illustrated in FIG. 8C. At step 851', the monitor 410 determines whether the seed pool count is less than the threshold for any row. It should be appreciated that in alternative embodiments, the monitor 410 may alternatively determine whether the row switch has closed and re-opened at step 851'. Once step 851' is satisfied, the monitor 410 preferably commands the variety switch 120 to select the post-event variety (i.e., the variety associated with the region on the other side of the nearest boundary based on the GPS position and heading of the planter).

Variety Switch, Row Switch, and Staging Pool—Systems

Figure 9A:
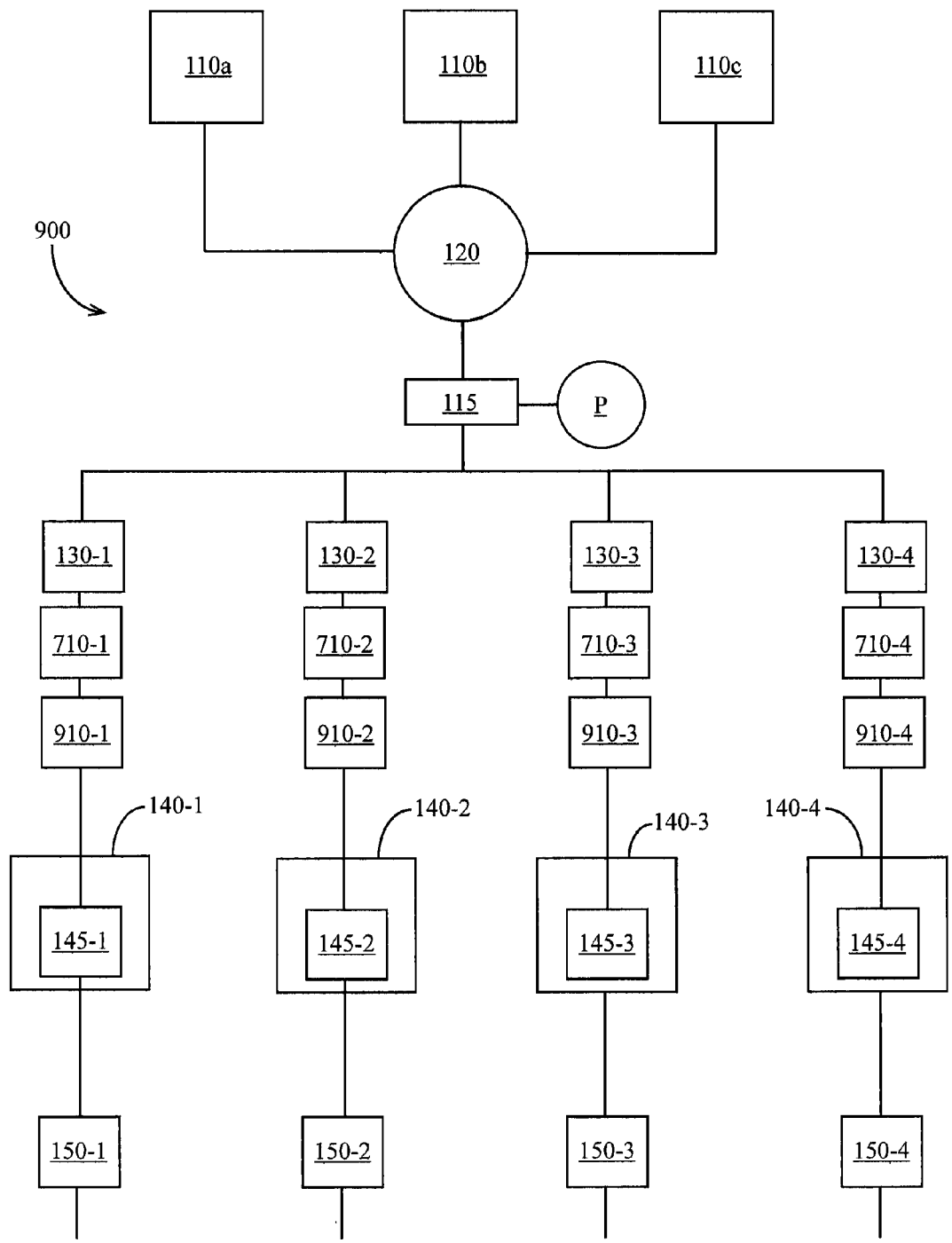
FIG. 9A illustrates an embodiment of an agricultural input selection system including staging pools.

Turning to FIG. 9A, a variety switch system 900 is illustrated. The variety switch system 700 is similar to one of the embodiments described with reference to FIG. 7 except that a staging pool 910 at each row unit 190 is preferably in seed communication with the entrainer 115 and disposed such that seeds flow through the staging pool 710 after passing the pre-meter sensor 130 (in embodiments having the sensor 130) and before passing through the row switch 710. Each staging pool 910 is preferably configured to selectively store seed upstream of the seed meter 140.

Figure 4C:
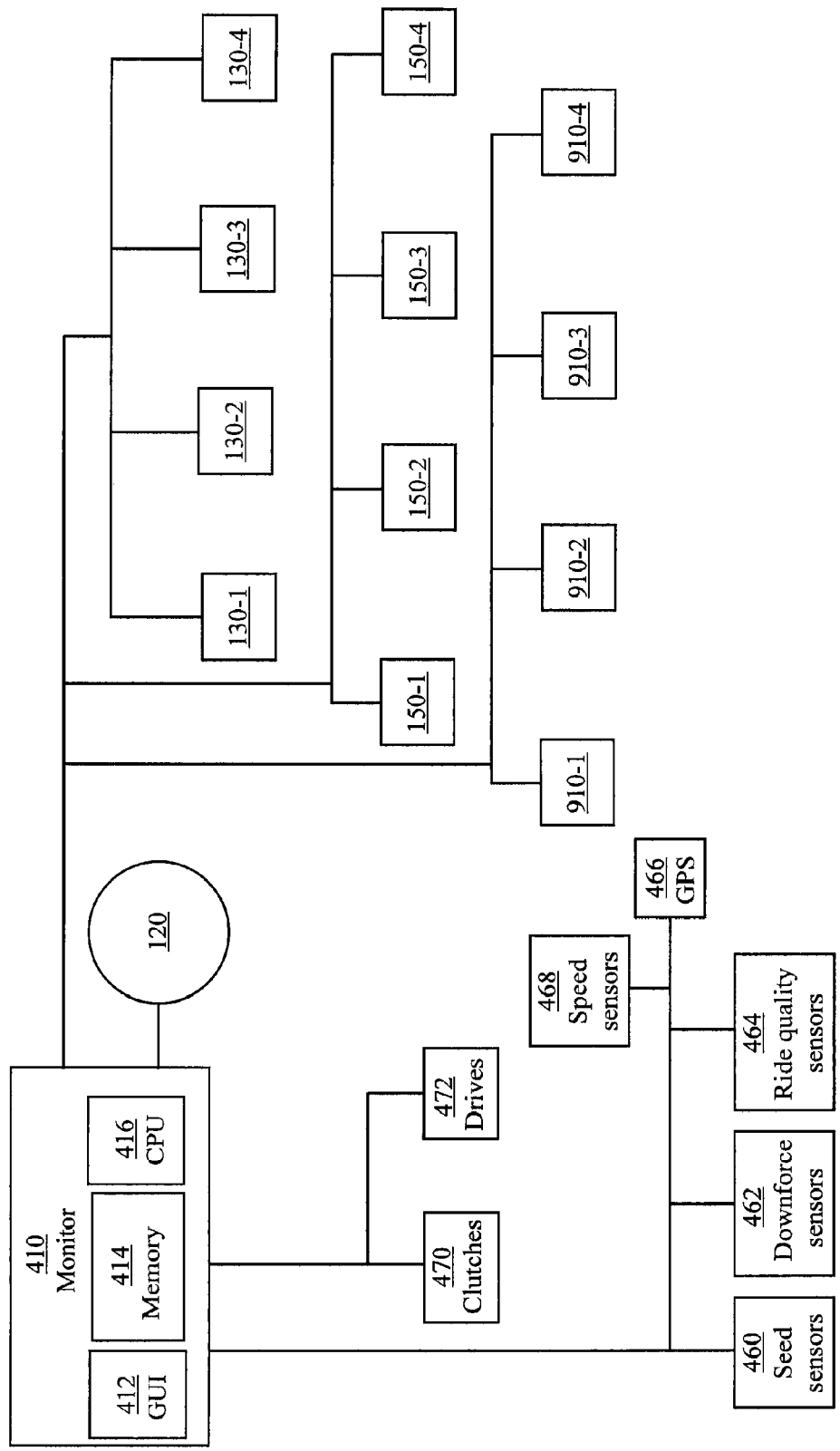
FIG. 4C illustrates yet another embodiment of an agricultural input selection system.

An electronic system 400'' for controlling the variety switch system 900 is illustrated in FIG. 4C. The system 400'' is similar to the system 400' except that the monitor is additionally in electrical communication with each staging pool 910.

Variety Switch, Row Switch and Staging Pool—Apparatus

Figure 9C:
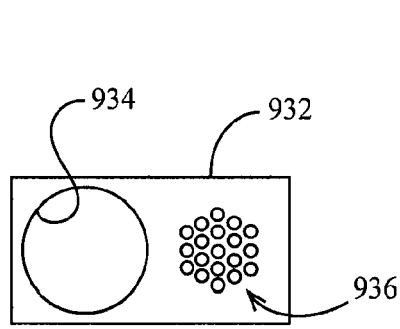
FIG. 9C is a top view of an embodiment of a slat of the staging pool of FIG. 9B.
Figure 9B:
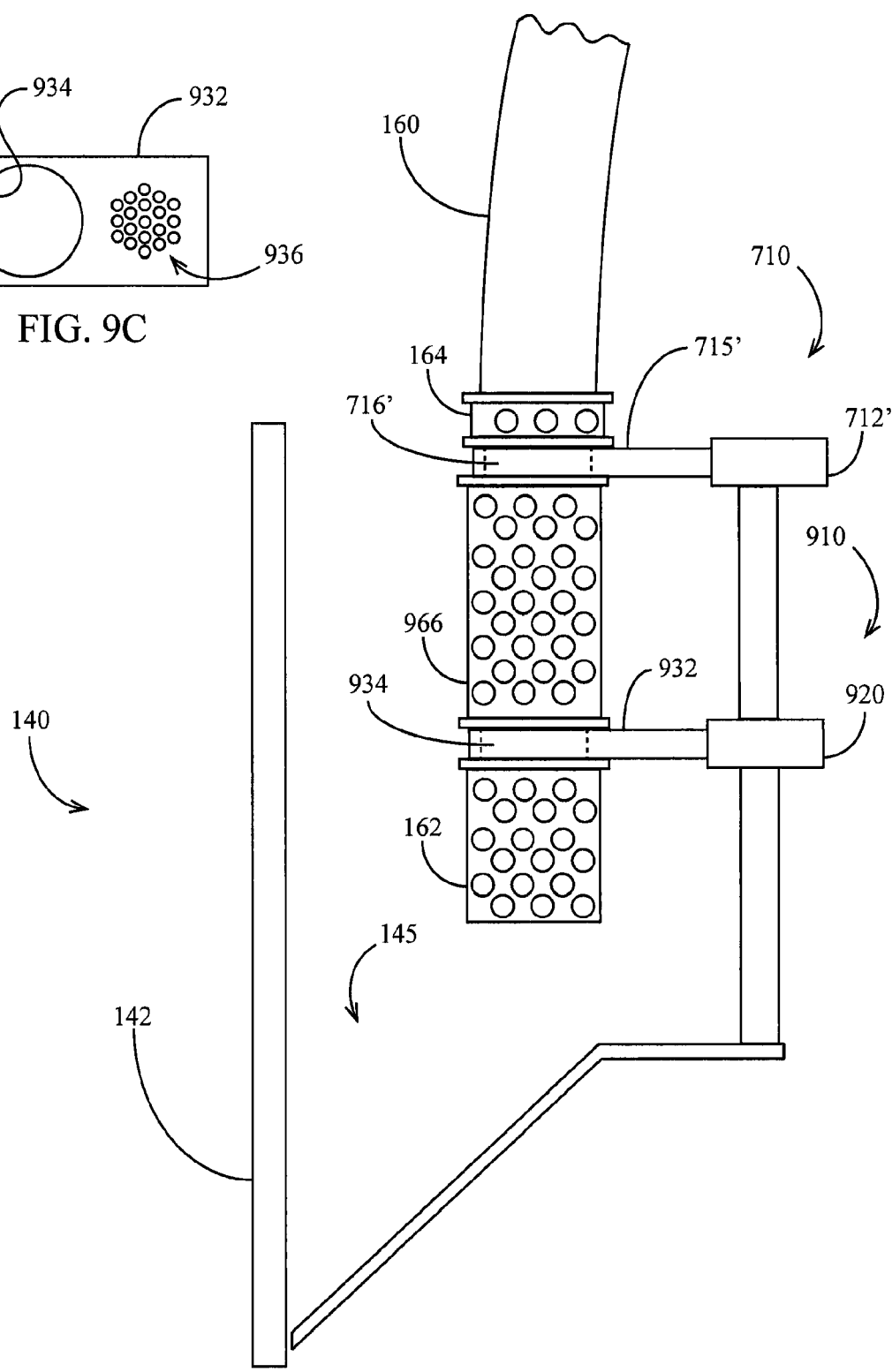
FIG. 9B is a partial front elevation view of an embodiment of a staging pool.

A preferred embodiment of the staging pool 910 is illustrated in FIG. 9B. The staging pool 910 includes an actuator 920 mounted to the meter 140 and operably coupled to a slat 932. As illustrated in FIG. 9C, the slat 932 preferably includes an orifice 934 sized to allow air and seed flow through the line 160 as well as an orifice array 936 configured to allow air flow through the line 160 but to prevent seed flow past the slat 932. The actuator 920 is preferably disposed to selectively move the slat 932 to open or close the line 160 to seed flow. The actuator 920 preferably comprises a pneumatic actuator. The actuator is also preferably spring-biased such that the slat 932 is biased into its right-most position (in the perspective of FIG. 9B) and the row switch 910 is normally open. A cylindrical vent 966 is preferably disposed between the switch 710 and the staging pool 910 such that seeds fill the vent 966 when the slate 932 is in its closed (left-most) position. It should be appreciated that as the vent 966 fills with seed, vent holes in the cylindrical wall of the vent as well as the orifice array 936 become increasingly blocked to air flow such that seed flow through the line 160 slows. In some embodiments, air flow is substantially blocked when the vent 966 is full of seed such that seed flow substantially stops when the vent 966 is full or substantially full of seed.

Variety Switch, Row Switch and Staging Pool—Methods

Figure 10A:
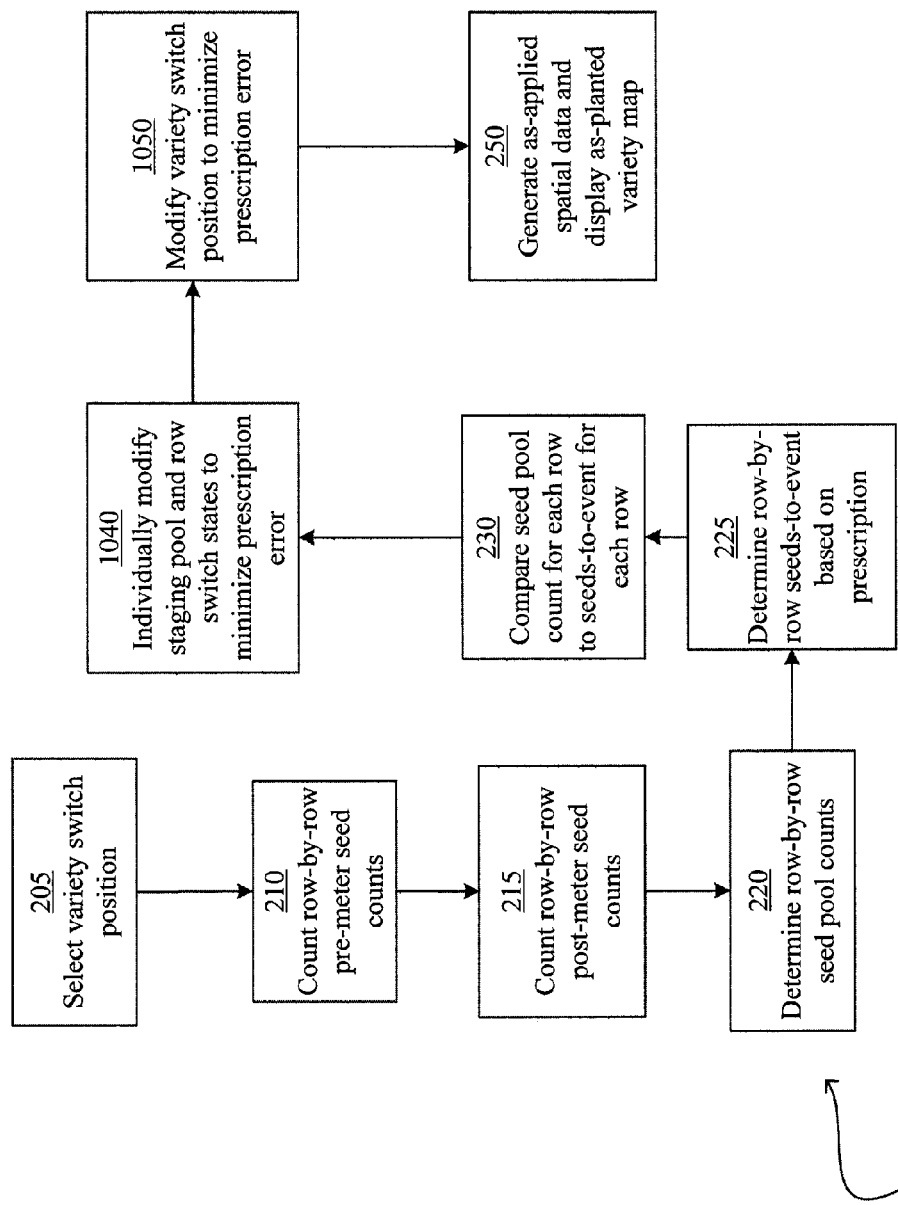
FIG. 10A illustrates a process for selecting a selecting agricultural inputs using staging pools.

Turning to FIG. 10A, a process 1000 is illustrated for selecting a state of the variety switch 120 and the row switches 710 and staging pools 910 at each row in the system 900. The process 1000 is similar to the process 800 of FIG. 8A except that step 840 is replaced with step 1040 and step 850 is replaced with step 1050.

Figure 10B:
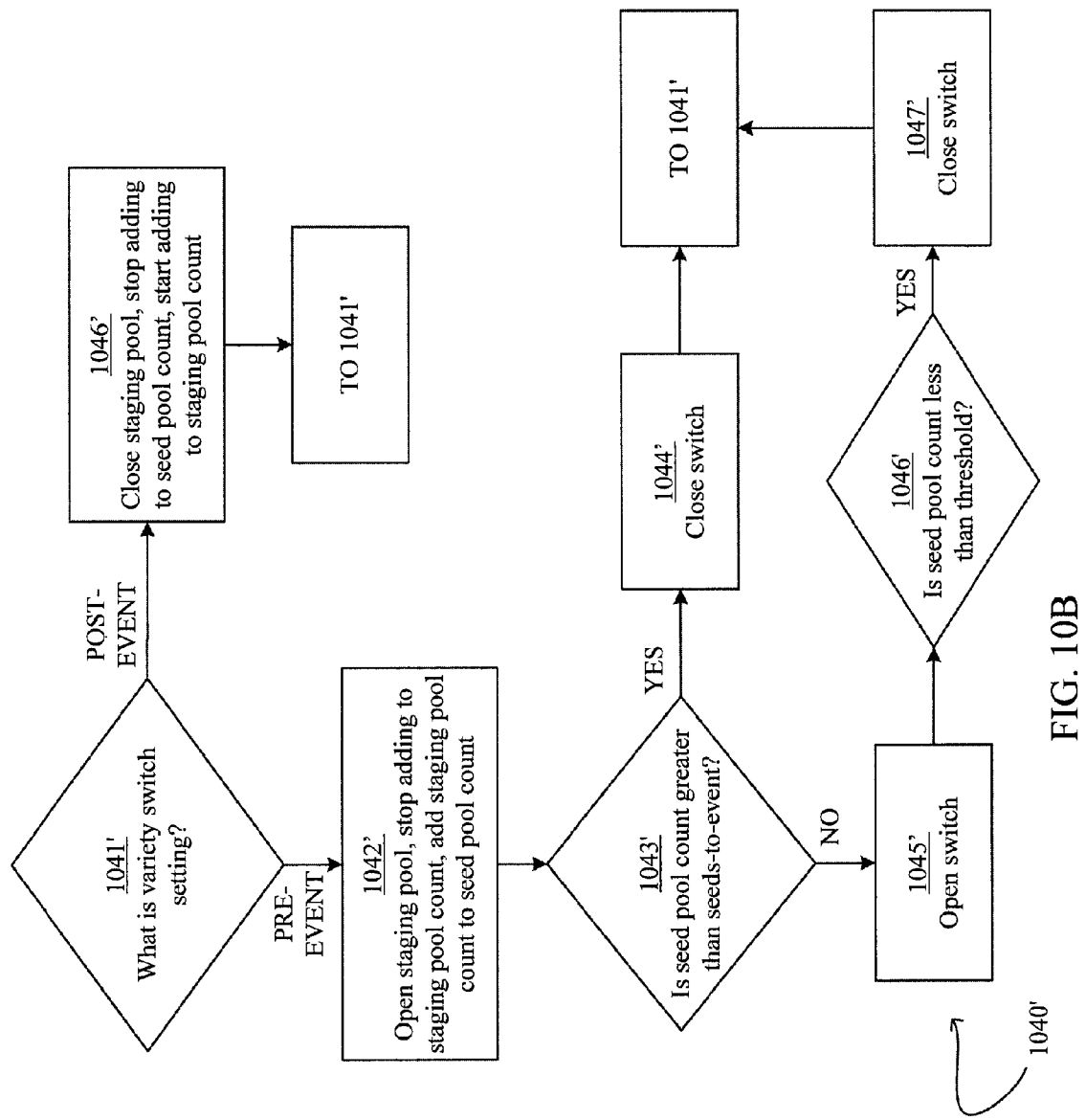
FIG. 10B illustrates a process for selecting a staging pool state.

At step 1040, the monitor 410 preferably modifies the states of the individual row switches 710 and staging pools 910 to minimize prescription error. A preferred process 1040' for carrying out step 1040 is illustrated in FIG. 10B. It should be appreciated that the process 1040' is carried out individually for each row unit 190. At step 1041', the monitor 410 preferably determines whether the variety switch 120 is set to the pre-event variety (i.e., the variety associated with the region on the same side of the boundary where the planter is presently located based on the GPS position and heading of the planter) or the post-event variety (i.e., the variety associated with the region on the other side of the nearest boundary based on the GPS position and heading of the planter).

If the variety switch 120 is set to the post-event variety, then at step 1046' the monitor 410 closes the staging pool slat 932. Because seeds passing the seed sensor 130 after the staging pool is closed are retained in the staging pool 910, the monitor 410 stops adding seeds passing the pre-meter sensor 130 to the seed pool count and begins adding those seeds to a separate staging pool count stored in the memory 414. Alternatively, an empirically known steady-state may be assigned to the staging pool count after a predetermined time.

If the variety switch 120 is set to the pre-event variety, then at step 1042' the monitor 410 preferably opens the staging pool, stops adding to the staging pool count, adds any existing staging pool count to the seed pool count and then adds subsequent seeds passing the pre-meter sensor 130 to the seed pool count. At step 1043', the monitor 410 determines whether the seed pool count is greater than the number of seeds-to-event. If step 1043' is satisfied, then at step 1044' the monitor 410 closes the row switch 710. If step 1043' is not satisfied, then at step 1045' the monitor 410 opens the row switch 710 and at step 1046' determines whether the seed pool count is less than a threshold. Once step 1046' is satisfied, at step 1047' the monitor 410 preferably closes the row switch 710.

Figure 10C:
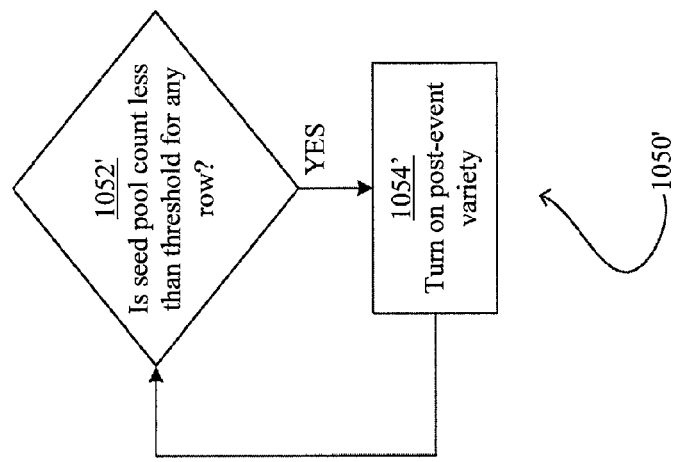
FIG. 10C illustrates a process for selecting a variety switch position.

At step 1050, the monitor 410 preferably modifies the variety switch position to minimize prescription error. A preferred process 1050' for carrying out step 1050 is illustrated in FIG. 10C. At step 1052', the monitor 410 determines whether the seed pool count is less than a threshold for any row. Once step 1052' is satisfied, the monitor 410 preferably commands the variety switch 120 to select the post-event variety in the prescription map.

Mapping Methods

Figure 6:
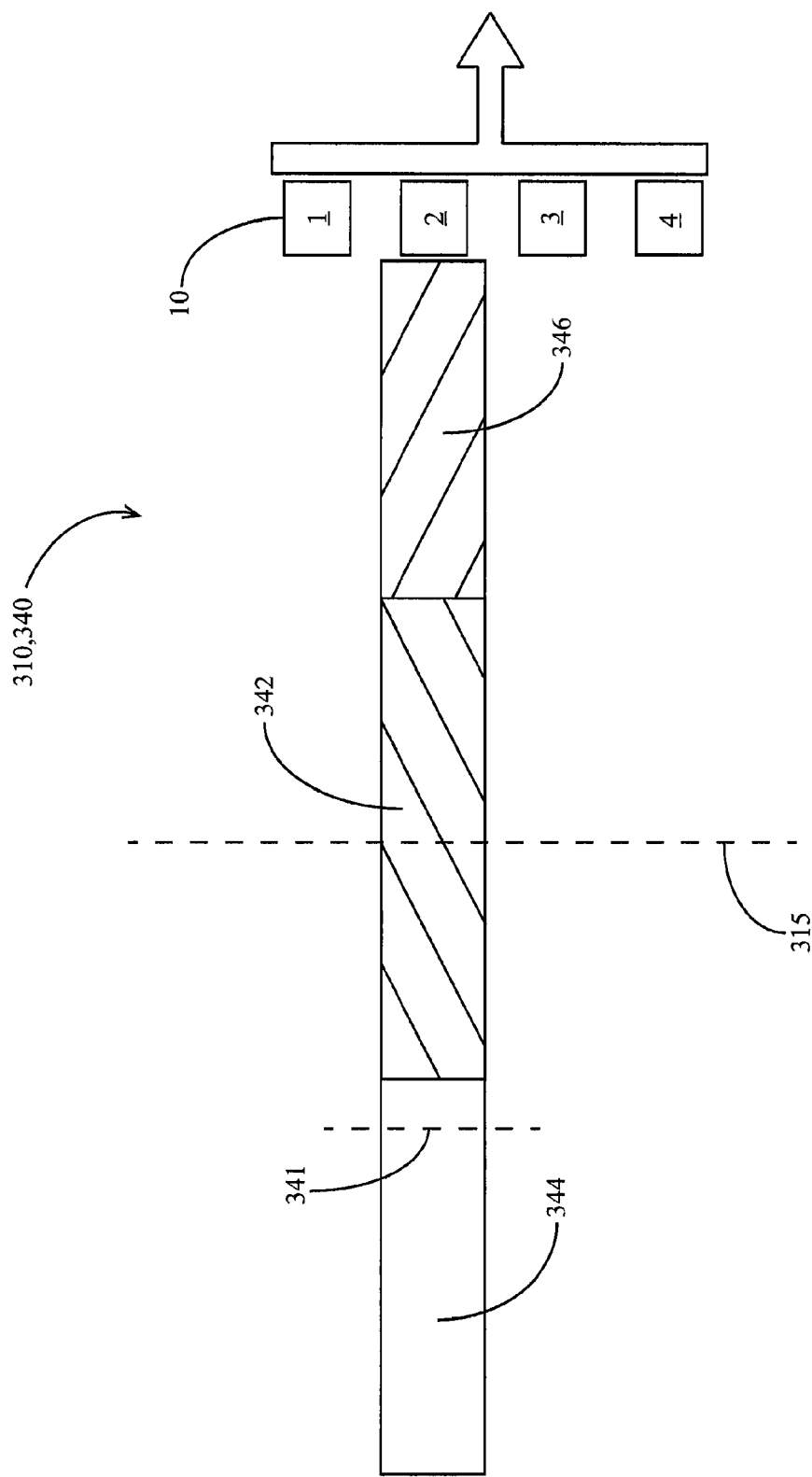
FIG. 6 illustrates an as-applied input variety map.

A process 1100 for generating and displaying mapping data is illustrated in FIG. 11. An embodiment of an as-planted variety map 340 displayed using the process 1100 is illustrated in FIG. 6 superimposed over a variety prescription map 310.

Referring to the process 1100 of FIG. 11, at step 1105 the monitor 410 records the GPS position of the planter. At step 1110, the monitor 410 determines a first variety switch position being applied to the variety switch 120. At step 1115, the monitor 410 assigns recorded positions to the first variety corresponding to the first variety switch position. For example, the region 344 in FIG. 6 is associated with the first variety. At step 1120, the monitor 410 determines whether the variety switch 120 has changed its setting to a second variety switch position associated with a second variety. Once step 1120 is satisfied (e.g., at position 341 in FIG. 6), at step 1125 the monitor 410 continues to assign positions to the first variety until a first predetermined number of seeds (e.g., 20 seeds) pass the sensor 150. At step 1130, the monitor 410 begins to assign positions to a mix of the first and second varieties (e.g., the region 342 is assigned to a mix of the first and second varieties). At step 1135, once a second predetermined number of seeds (e.g., 50 seeds) has passed the seed sensor 150 after the first predetermined number, the monitor 410 begins to assign positions to the second variety (e.g., the region 346 is assigned to the second variety).

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. A system for selecting agricultural inputs for application on a field, comprising:
   a first input source containing a first agricultural input for application in a first region of a field;
   a second input source containing a second agricultural input for application on a second region of the field;
   a first meter configured to meter said first and second agricultural inputs;
   a variety selector configured to selectively place said first and second agricultural inputs from said first and second input sources in fluid communication with said first meter; and
   a first pre-meter sensor disposed along a first seed supply line to sense passage of said agricultural inputs through said first seed supply line, said first seed supply line extending between said variety selector and said first meter;
   whereby, said first pre-meter sensor senses passage of said agricultural inputs from said first and second input sources to said first meter.

2. The system of claim 1, further comprising:
   a second meter configured to meter said first and second agricultural inputs, said second meter in fluid communication with said variety selector, wherein said variety selector is configured to selectively place said first input source and said second input source in fluid communication with said first meter and said second meter.

3. The system of claim 2, further comprising:
   a second pre-meter sensor disposed along a second seed supply line to sense passage of said first and second agricultural inputs through said second seed supply line, said second seed supply line extending between said variety selector and said second meter.

4. The system of claim 1, further comprising:
   a first post-meter sensor disposed to sense said first and second agricultural inputs metered by said first meter after said first and second agricultural inputs are metered by said first meter.

5. The system of claim 3, further comprising:
   a second post-meter sensor disposed to sense said first and second agricultural inputs metered by said second meter after said first and second agricultural inputs are metered by said second meter.

6. The system of claim 1, further comprising:
   a monitor capable of controlling said variety selector and capable of receiving signals from said pre-meter sensor, said monitor capable of estimating an amount of said first and second agricultural inputs communicated to said first meter.

7. The system of claim 6 wherein said monitor has a prescription map stored in memory and is in communication with a global positioning receiver, said prescription map associating said first agricultural input with a first region of the field, said prescription map associating said second agricultural input with a second region of the field, a boundary between said first region and said second region defining an event occurrence, whereby said monitor selectively positions said variety selector to apply said first agricultural input in said first region and said second agricultural input in said second region in response to an input switch command corresponding to said event occurrence.

8. The system of claim 7, wherein said monitor is capable of timing said input switch command based on said estimate.

9. The system of claim 7, wherein said monitor is capable of determining a number of seeds to a variety switch event, wherein said monitor is configured to compare said number of seeds to said estimate, and wherein said monitor is configured to send said input switch command when said number of seeds is approximately equal to said estimate.

10. The system of claim 6, further comprising:
a row switch in fluid communication with said first meter and said variety selector, said row switch disposed to prevent said first or second agricultural inputs from communicating between said variety selector to said first meter.

11. The system of claim 10, wherein said monitor is capable of sending a row shutoff signal to said row switch to prevent agricultural input from communication between said variety selector to said first meter in response to said row shutoff signal.

12. The system of claim 11, wherein said monitor is capable of estimating of an amount of agricultural input contained in said first meter, and capable of timing said row shutoff signal to minimize a prescription error.

13. The system of claim 12, further including:
a staging pool disposed downstream of said row switch, said staging pool configured to prevent seed from entering a agricultural input pool of said first meter.

14. A method of varying agricultural inputs in a field during planting operations, comprising:
determining a distance of a row unit to an event occurrence on a prescription map;
counting a first number of seeds transmitted to a seed meter;
counting a second number of seeds deposited by said seed meter;
estimating a seed pool count based on said first number of seeds and said second number of seeds;
estimating a number of seeds-to-event; and
selecting a variety switch position based on said number of seeds-to-event in relation to said estimated seed pool count, in order to minimize a prescription error.

15. The method of claim 14 wherein said event occurrence is a row shutoff state.

16. The method of claim 14 wherein said event occurrence is a change in seed variety.

17. The method of claim 14 further comprising:
modifying said variety switch position when said seed pool count is greater than or equal to said number of seeds-to-event.

18. The method of claim 14 further comprising:
modifying a row shutoff state in order to minimize a prescription error.

19. The method of claim 18, wherein said step of modifying said row shutoff state includes comparing said estimated seed pool count to a threshold.

20. A multi-variety seed planter, comprising:
a plurality of row units, each row unit supporting a seed meter;
a plurality of seed hoppers each containing a different seed variety corresponding to seed variety regions of a prescription map of a field to be planted;
a variety selector disposed to permit communication of said different seed varieties from each of said plurality of seed hoppers to said seed meter of each of said plurality of row units;
a pre-meter sensor associated with each seed meter, said pre-meter sensor disposed along a seed supply line, said pre-meter sensor configured to detect said seeds communicated to said seed meter;
a post-meter sensor associated with each seed meter to detect said seeds dispensed by said seed meter; and
a monitor in communication with a GPS receiver to detect heading and position of each row unit in relation to boundaries on said prescription map defining post-event seed varieties and pre-event seed varieties as the row units pass over said boundaries, said monitor capable of determining a quantity of seeds communicated to said seed meter detected by said pre-meter sensor and capable of determining a quantity of seeds dispensed by said seed meter detected by said post-meter sensor so as to determine seeds-to-event of each of said plurality of row units, said monitor controlling said variety selector based on said determined seeds-to-event so as to switch from communicating said pre-event seed varieties to said post-event seed varieties to minimize prescription errors as said row units pass over said boundaries.

* * * * *